United States Patent
Jean

(10) Patent No.: US 12,202,293 B2
(45) Date of Patent: Jan. 21, 2025

(54) METHOD FOR MAKING A METALLIC CREDIT CARD

(71) Applicant: Travis Jean LLC, Boise, ID (US)

(72) Inventor: Travis Jean, Meridian, ID (US)

(73) Assignee: Travis Jean LLC, Boise, ID (US)

( * ) Notice: Subject to any disclaimer, the term of this patent is extended or adjusted under 35 U.S.C. 154(b) by 254 days.

(21) Appl. No.: 17/592,979

(22) Filed: Feb. 4, 2022

(65) Prior Publication Data

US 2023/0249489 A1 Aug. 10, 2023

(51) Int. Cl.
*G06K 19/077* (2006.01)
*B42D 25/373* (2014.01)
*B42D 25/425* (2014.01)
*B42D 25/465* (2014.01)
*B42D 25/475* (2014.01)

(52) U.S. Cl.
CPC ......... *B42D 25/475* (2014.10); *B42D 25/373* (2014.10); *B42D 25/425* (2014.10); *B42D 25/465* (2014.10); *G06K 19/0772* (2013.01); *G06K 19/07743* (2013.01); *G06K 19/07747* (2013.01)

(58) Field of Classification Search
CPC ......... G06K 1/12; B42D 25/40; B42D 25/475
See application file for complete search history.

(56) References Cited

U.S. PATENT DOCUMENTS

| | | | | |
|---|---|---|---|---|
| 5,936,227 | A * | 8/1999 | Truggelmann | ... G06K 19/07739 235/487 |
| 8,998,098 | B2 * | 4/2015 | Bosquet | ........... G06K 19/07743 235/492 |
| 11,157,790 | B1 * | 10/2021 | Santos | ............. G06K 19/07745 |
| 11,562,194 | B2 * | 1/2023 | Vu | ........................ G07F 7/1008 |
| 2015/0306897 | A1 | 10/2015 | Lamb et al. | |

OTHER PUBLICATIONS

Ex Parte Quayle Office Action dated Dec. 21, 2023 for U.S. Appl. No. 17/979,470.

* cited by examiner

*Primary Examiner* — Edwyn Labaze
*Assistant Examiner* — April A Taylor
(74) *Attorney, Agent, or Firm* — DICKINSON WRIGHT RLLP; Hector A. Agdeppa

(57) ABSTRACT

A method of making a metallic credit card from an existing plastic credit card including the steps of cutting the existing plastic credit card from each side edge, peeling the plastic top layer from its bottom plastic substrate, removing its EMV chip, and attaching it to a metallic substrate. The metallic substrate can further be laser engraved with the user's personal information.

10 Claims, 4 Drawing Sheets

METHOD FOR MAKING A METALLIC CREDIT CARD

CROSS-REFERENCE TO RELATED APPLICATION

There are no related applications incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to a method of making a metallic credit card from an existing plastic credit card.

2. Description of the Related Art

Prior art methods of making a metallic credit card from an existing plastic credit card primarily rely on using a heat gun to apply heat to the credit card to loosen the adhesive between its layers and then pry its EMV chip free, however, this method usually results in damage to the EMV chip. A mechanical punch mechanism has also been used to punch out the EMV chip from the rest of the credit card, however, this also usually results in damage to the EMV chip.

Accordingly, the present invention overcomes the disadvantages associated with the prior art, by providing a method of making a metallic credit card from an existing plastic credit card including the steps of cutting the corners of the existing plastic credit card, peeling the plastic top layer from its bottom plastic substrate, removing its EMV chip, and attaching it to a metallic substrate.

BRIEF SUMMARY OF THE INVENTION

In view of the foregoing disadvantages inherent in the known types of credit cards or the like in the prior art, the present invention provides a method of making a metallic credit card from an existing plastic credit card including the steps of cutting the existing plastic credit card from its edges towards its EMV chip, peeling the plastic top layer from its bottom plastic substrate, removing its EMV chip, and attaching it to a metallic substrate. The metallic substrate can further be laser engraved with the user's personal information.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 1:
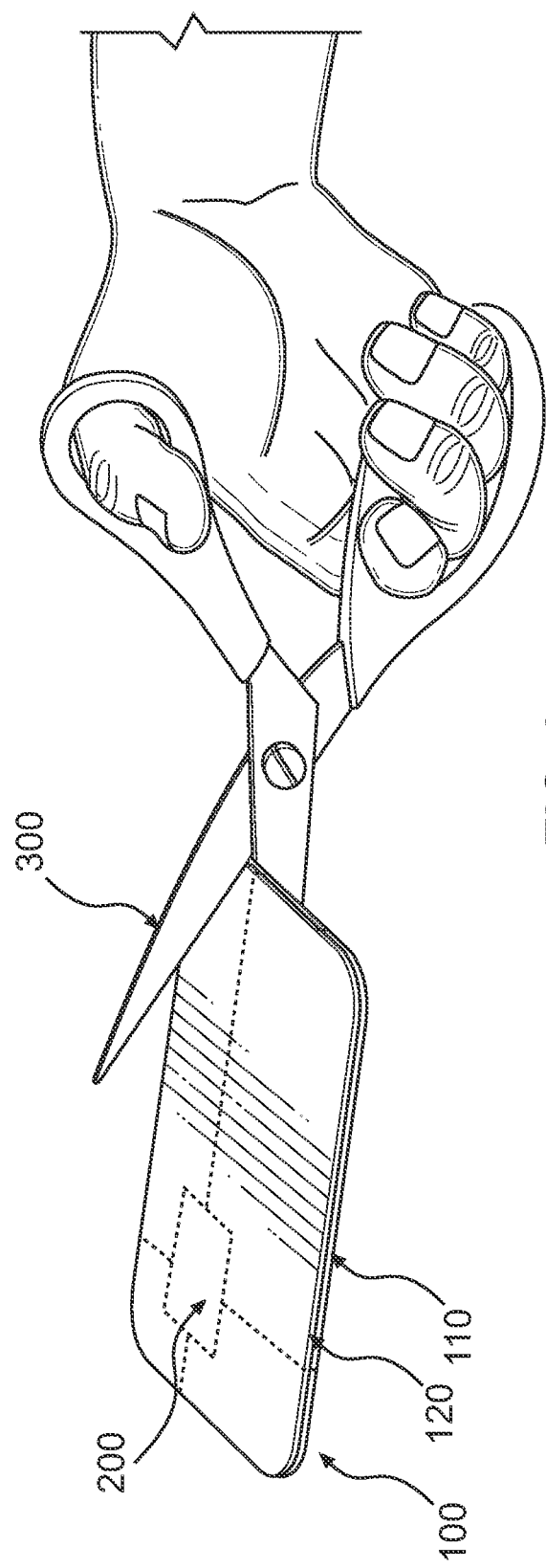
FIG. 1 shows a perspective view of the step of cutting a credit card within the method of making a metallic credit card of according to the preferred embodiment of the present invention.
Figure 2:
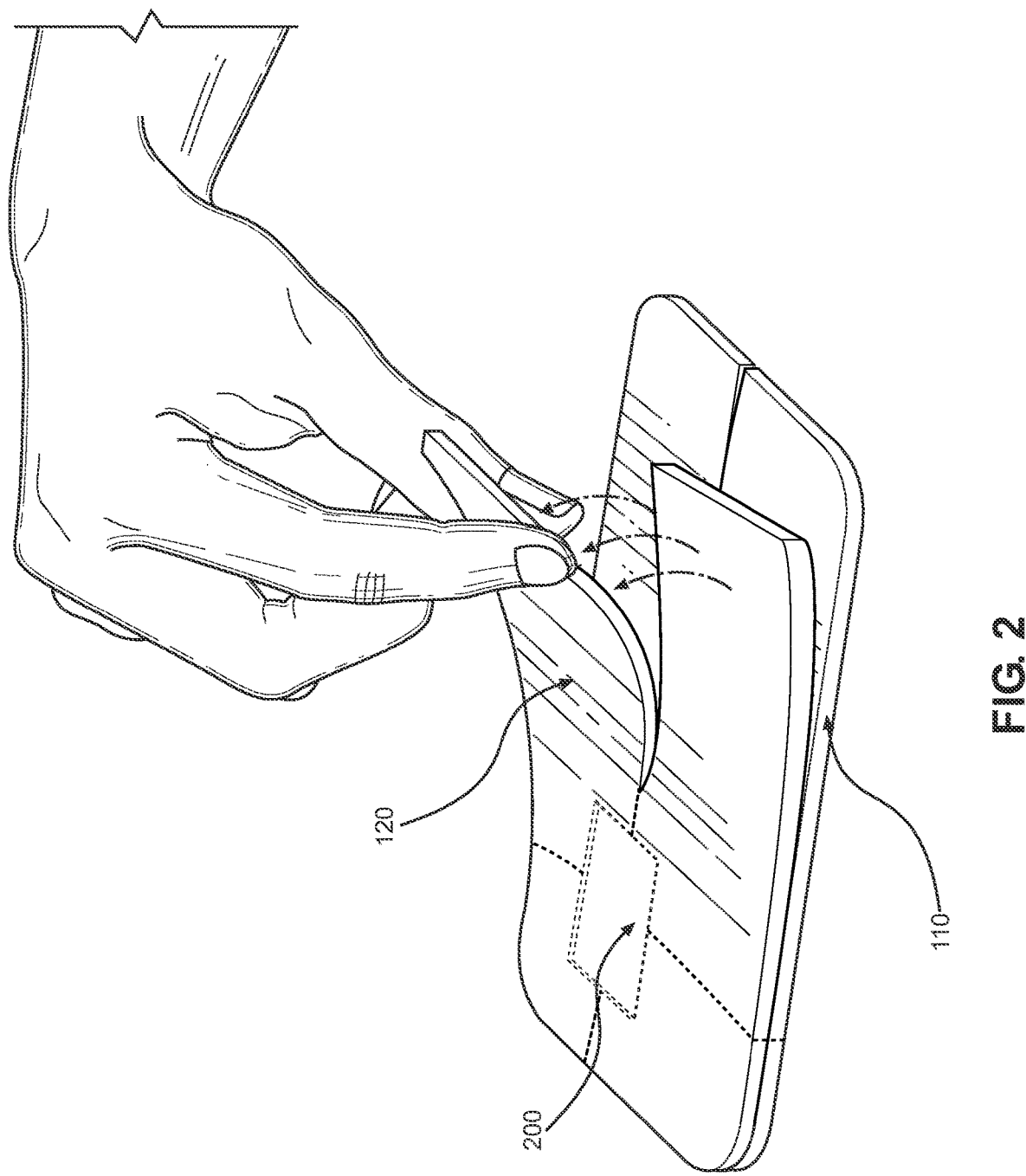
FIG. 2 shows a perspective view of the step of peeling the top layer off of the credit card within the method of making a metallic credit card of according to the preferred embodiment of the present invention of FIG. 1.
Figure 3:
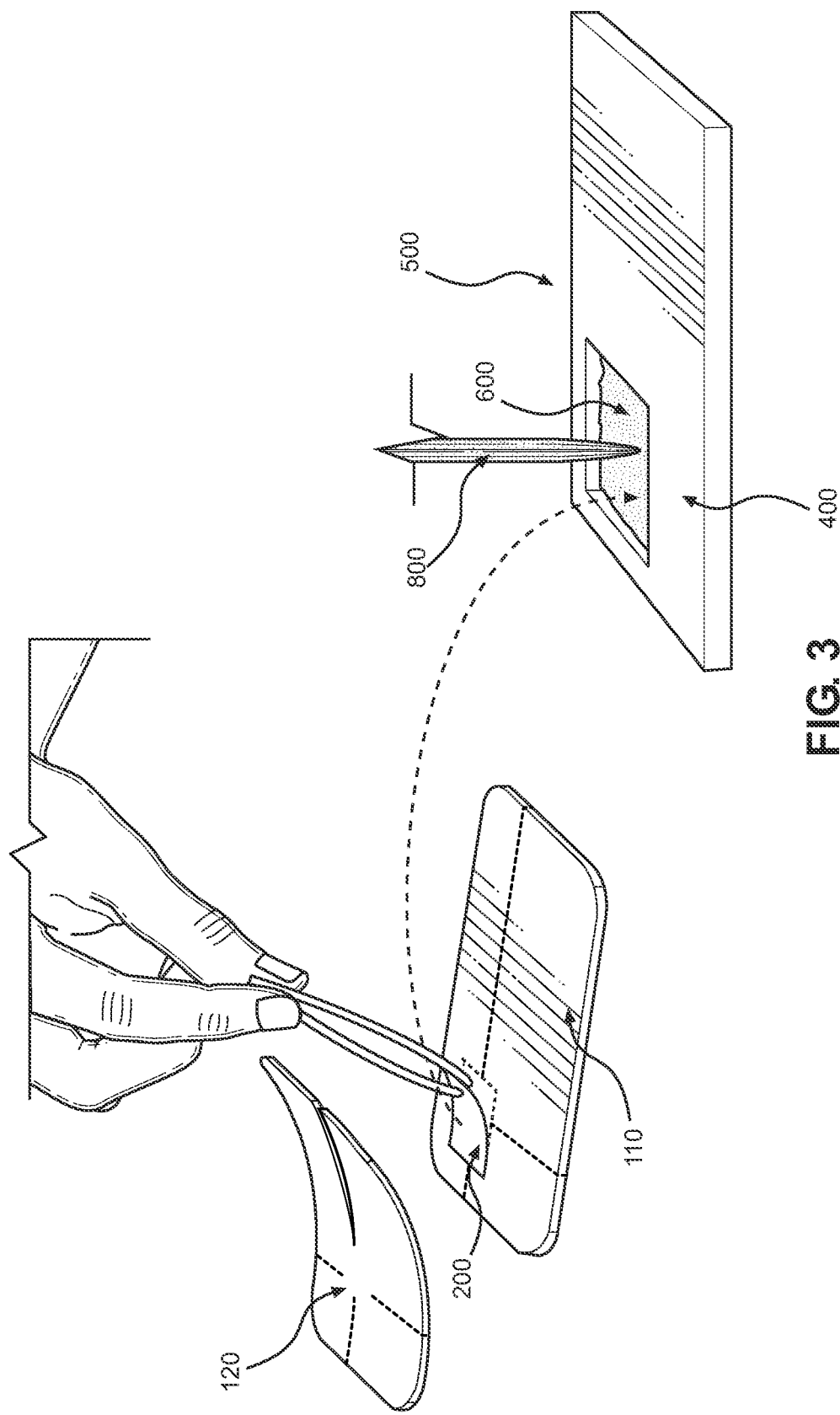
FIG. 3 shows a perspective view of the steps of detaching said electronic computer chip from said plastic substrate and providing a metallic substrate within the method of making a metallic credit card of according to the preferred embodiment of the present invention of FIG. 1.
Figure 4:
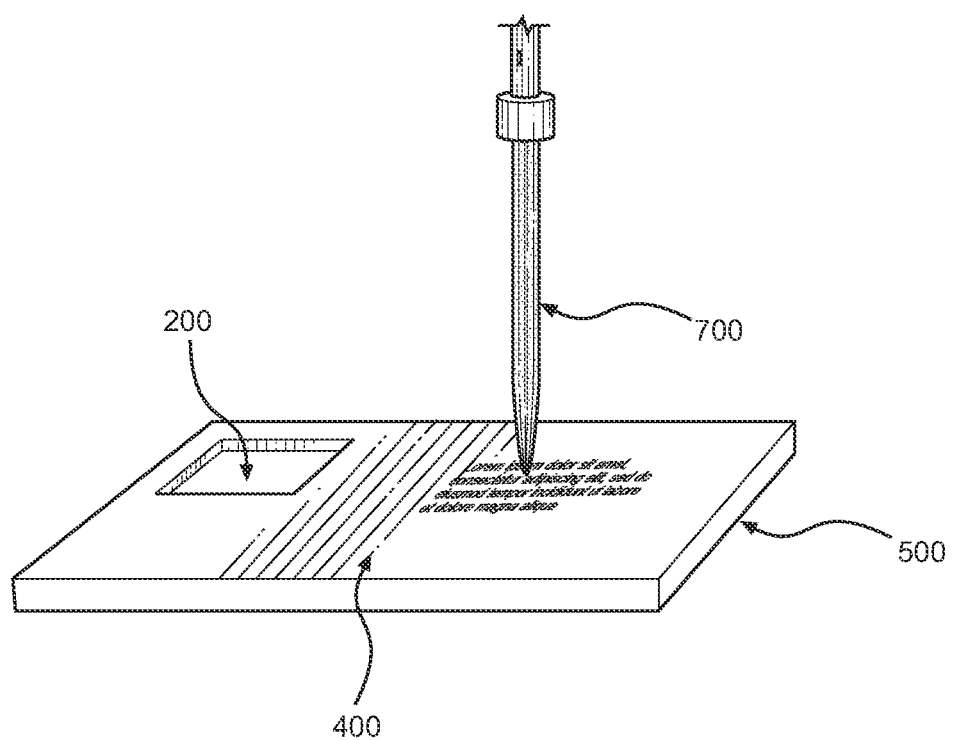
FIG. 4 shows a perspective view of the steps of attaching the electronic computer chip to a metallic substrate and engraving the metallic substrate with personal information of a user within the method of making a metallic credit card of according to the preferred embodiment of the present invention of FIG. 1.

Turning now descriptively to drawing, referring to FIGS. 1-4, the present invention discloses a method of making a metallic credit card comprising the steps of providing a plastic credit card 100 including a plastic substrate 110, an electronic computer chip 200 attached to the plastic substrate 110, and a plastic top layer 120, wherein the plastic top layer is laminated upon the plastic substrate thereby encasing the electronic computer chip 200 therebetween, and wherein the plastic credit card 100 is formed having a top edge, a bottom edge, and two side edges, and wherein the credit card is formed having a flat rectangular shape having four corners; providing and using a cutting tool 300 to cut the credit card from the top edge toward the electronic computer chip, cut the credit card from the bottom edge toward the electronic computer chip, and cut the credit card from the two side edges toward the electronic computer chip of the plastic credit card 100; peeling the plastic top layer 120 off of the plastic substrate beginning from one of the cut four corners; detaching the electronic computer chip 200 from the plastic substrate 110; providing a metallic substrate 400; and attaching the electronic computer chip 200 to the metallic substrate 400, thereby forming the metallic credit card 500.

The step of attaching the electronic computer chip 200 to said metallic substrate 400 may further include providing an adhesive 600 in between the electronic computer chip and the metallic substrate, wherein the adhesive 600 may be formed as an epoxy glue, such as cyanoacrylate. Furthermore, the step of laser engraving 700 the metallic substrate with personal information of a user may also be incorporated.

Another step of forming the metallic credit card may include forming a depression 800 within the metallic substrate 400, before the step for attaching the electronic computer chip 200 to the metallic substrate 400, for the electronic computer chip to be placed therein, such that when the electronic computer chip is placed there it forms a flat surface with the metallic substrate 400.

In the preferred embodiment, the cutting tool 300 is a scissor, and the electronic computer chip 200 is formed as an EMV chip. Furthermore, the metallic substrate 400 may be formed from a material chosen from a list of materials consisting of stainless steel, copper, and aluminum.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A method of making a metallic credit card comprising the steps of:
    providing a plastic credit card including:
        a plastic substrate;
        an electronic computer chip;
            wherein said electronic computer chip is attached to said plastic substrate; and
        a plastic top layer;
            wherein said plastic top layer is laminated upon said plastic substrate thereby encasing said electronic computer chip therebetween;
        a top edge;
        a bottom edge; and
        two side edges;
            wherein said plastic credit card is formed having a flat rectangular shape having four corners;
    providing a cutting tool;
    using said cutting tool to cut said credit card from said top edge toward said electronic computer chip; cut said credit card from said bottom edge toward said electronic computer chip; and cut said credit card from said two side edges toward said electronic computer chip;
    peeling said plastic top layer off of said plastic substrate;
    detaching said electronic computer chip from said plastic substrate;
    providing a metallic substrate;
    attaching said electronic computer chip to said metallic substrate, thereby forming said metallic credit card.

2. The method of making the metallic credit card of claim 1, wherein said step of attaching said electronic computer chip to said metallic substrate includes:
    providing an adhesive in between said electronic computer chip and said metallic substrate.

3. The method of making the metallic credit card of claim 2, wherein said adhesive in between said electronic computer chip and said metallic substrate.is formed as an epoxy glue.

4. The method of making the metallic credit card of claim 3, wherein said epoxy glue is formed from an cyanoacrylate adhesive.

5. The method of making the metallic credit card of claim 1, further comprising the step of: laser engraving said metallic substrate with personal information of a user.

6. The method of making the metallic credit card of claim 1, further comprising the steps of: forming a depression within said metallic substrate, before said step for attaching said electronic computer chip to said metallic substrate, for said electronic computer chip to be placed therein, such that when said electronic computer chip is placed within said metallic substrate, said electronic computer chip forms a flat surface with said metallic substrate.

7. The method of making the metallic credit card of claim 1, wherein said cutting tool is a scissor.

8. The method of making the metallic credit card of claim 1, wherein said metallic substrate is formed having a flat rectangular shape forming four corners.

9. The method of making the metallic credit card of claim 1, wherein said electronic computer chip is formed as an EMV chip.

10. The method of making the metallic credit card of claim 1, wherein said metallic substrate is formed from a material chosen from a list of materials consisting of stainless steel, copper, and aluminum.

* * * * *